(12) United States Patent
Davis et al.

(10) Patent No.: US 8,752,262 B2
(45) Date of Patent: Jun. 17, 2014

(54) SUPPLEMENTAL ELEVATOR BRAKE AND RETROFITTING INSTALLATION PROCEDURE

(75) Inventors: Daniel B. Davis, Middlefield, CT (US); Valery Sheynkman, West Hartford, CT (US); Kenneth V. Allen, Cumming, GA (US); Jesse R. Richter, West Hartford, CT (US); Michael P. Keenan, Suffield, CT (US); Gregory M. Oseep, West Simsbury, CT (US); Robert Scott Farmer, Zephyr Hills, FL (US); Doug B. LaBrecque, West Springfield, MA (US); Christopher H. Koenig, Granby, CT (US); Michael Joseph Concannon, Tampa, FL (US)

(73) Assignee: Otis Elevator Company, Farmington, CT (US)

(*) Notice: Subject to any disclaimer, the term of this patent is extended or adjusted under 35 U.S.C. 154(b) by 652 days.

(21) Appl. No.: 12/696,238

(22) Filed: Jan. 29, 2010

(65) Prior Publication Data
US 2011/0147129 A1    Jun. 23, 2011

Related U.S. Application Data

(60) Provisional application No. 61/288,965, filed on Dec. 22, 2009.

(51) Int. Cl.
*B66B 5/20* (2006.01)

(52) U.S. Cl.
USPC .............. 29/401.1; 29/402.05; 187/356

(58) Field of Classification Search
USPC ............. 29/892.1, 402.04, 402.05, 402.12, 29/402.14, 525.01, 525.02, 525.11, 557; 187/288, 356, 359; 188/218 XL, 73.2; 248/674; 269/43, 71; 408/76
See application file for complete search history.

(56) References Cited

U.S. PATENT DOCUMENTS

| | | | |
|---|---|---|---|
| 4,923,055 A * | 5/1990 | Holland | 187/287 |
| 5,085,295 A * | 2/1992 | Wautelet et al. | 188/73.2 |
| 5,156,239 A * | 10/1992 | Ericson et al. | 187/254 |
| 5,669,469 A | 9/1997 | Ericson et al. | |
| RE36,034 E | 1/1999 | Sheridan | |
| 5,944,150 A * | 8/1999 | Hikari | 188/161 |
| 6,478,124 B2 | 11/2002 | Cholinski | |
| 6,520,299 B2 | 2/2003 | Rimann et al. | |
| 7,216,408 B2 * | 5/2007 | Boyl-Davis et al. | 29/33 R |
| 2002/0124693 A1 * | 9/2002 | Newell et al. | 82/1.11 |
| 2009/0236186 A1 * | 9/2009 | Weiss et al. | 187/359 |

* cited by examiner

*Primary Examiner* — Lee D Wilson
*Assistant Examiner* — Steven A Maynard
(74) *Attorney, Agent, or Firm* — Carlson, Gaskey & Olds

(57) ABSTRACT

An exemplary method of retrofitting a brake onto an elevator machine that was previously installed in an elevator system includes selecting a surface of the elevator machine that rotates as a sheave of the machine rotates. A braking surface is provided on the selected surface. At least one brake member is installed in a position to selectively engage the braking surface.

17 Claims, 13 Drawing Sheets

SUPPLEMENTAL ELEVATOR BRAKE AND RETROFITTING INSTALLATION PROCEDURE

CROSS REFERENCE TO RELATED APPLICATIONS

This application claims priority to U.S. Provisional Application No. 61/288,965, which was filed on Dec. 22, 2009.

BACKGROUND

Elevator systems are useful for carrying passengers between various levels in a building. There are various type of elevator systems. Some are referred to as traction-based systems because they rely upon traction between a drive sheave and hoisting ropes to move and position the elevator car as desired. Elevator machines in traction-based systems include a motor and a brake. There are a variety of known brake configurations.

Supplemental brakes for conventional elevator machines are known. Some elevator codes require braking functions that are not provided by older machines. Supplemental brakes can be added to meet such code requirements. One type of supplemental brake is referred to as a rope grabber because it provides a mechanism for clamping onto the roping arrangement. A rope grabber prevents the roping arrangement from moving, which maintains a current position of an elevator car within a hoistway, for example.

One drawback associated with rope grabber braking devices is that they need to be positioned below the machine. This requires taking up space within the hoistway or raising the machine up within a machine room to provide adequate spacing for the rope grabber below the machine. Either alternative is undesirable because of inconvenience and the amount of space that it requires.

SUMMARY

An exemplary method of retrofitting a brake onto an elevator machine that was previously installed in an elevator system includes selecting a surface of the elevator machine that rotates as a sheave of the machine rotates. A braking surface is provided on the selected surface. At least one brake member is installed in a position to selectively engage the braking surface.

An exemplary kit for retrofitting a supplemental brake onto an elevator machine that is already installed in an elevator system includes a machining bracket configured to be secured in a fixed position relative to the elevator machine to provide a fixed reference and working surface to facilitate installing the supplemental brake. A plurality of ring portions and locating members for at least temporarily positioning the ring portions adjacent the selected surface are also included. Mounting members are provided for securing the ring portions in a desired position relative to the machine such that the ring portions establish a braking disk. At least one brake device is configured to be supported on a machine frame so that the brake device can selectively engage the braking disk.

An exemplary elevator machine retrofitted from an original arrangement includes a sheave. At least one component rotates with the sheave and includes a braking surface that did not exist in the original arrangement. At least one brake selectively engages the braking surface.

The various features and advantages of this invention will become apparent to those skilled in the art from the following detailed description. The drawings that accompany the detailed description can be briefly described as follows.

DETAILED DESCRIPTION

Figure 1:
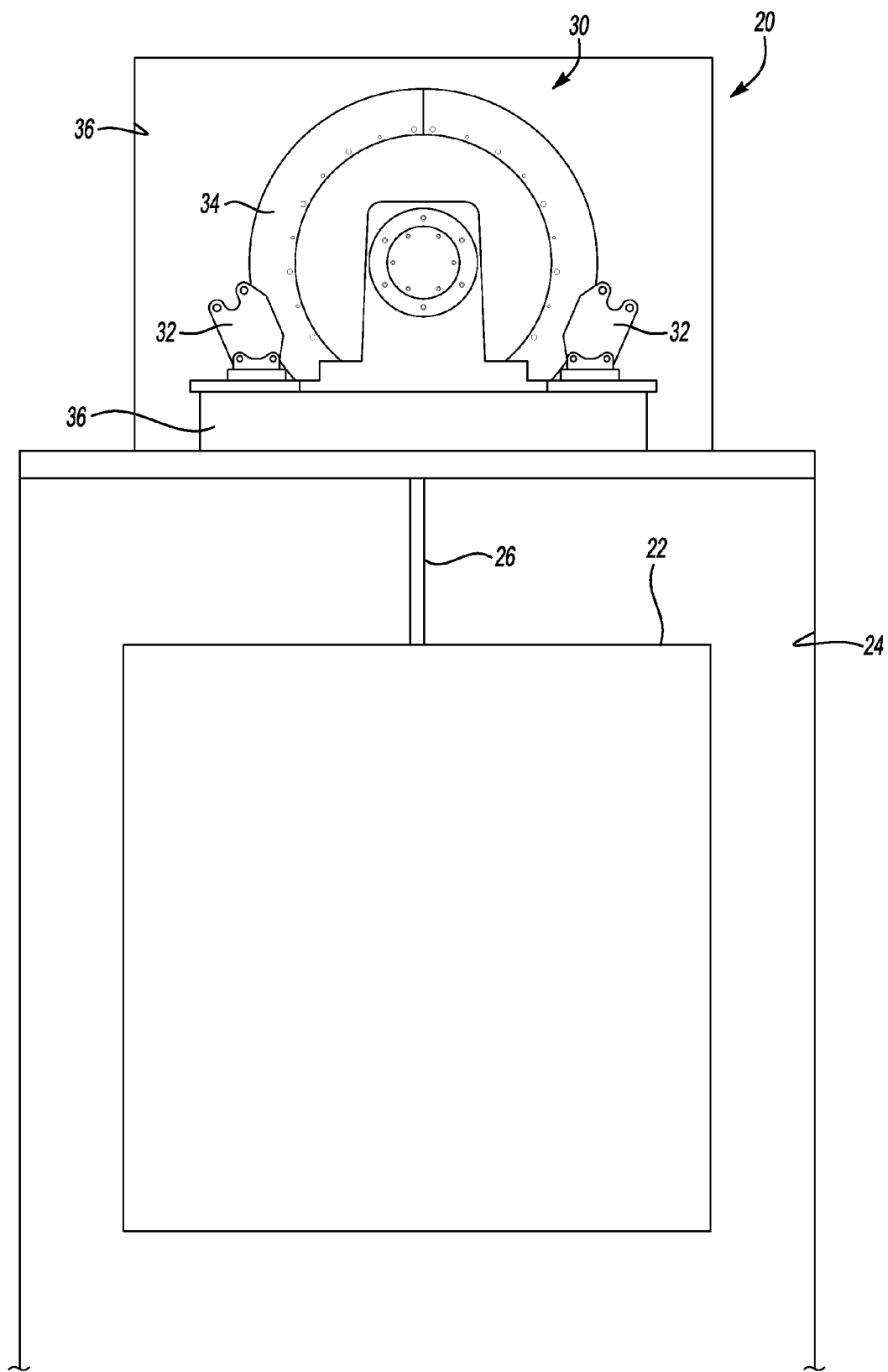
FIG. 1 schematically illustrates selected portions of an exemplary elevator system utilizing an embodiment of this invention.

FIG. 1 schematically shows selected portions of an exemplary elevator system 20. An elevator car 22 is situated for movement within a hoistway 24. The elevator car 22 is supported by a roping arrangement 26.

An elevator machine 30 causes desired movement of the elevator car 22 to provide desired elevator service. The elevator machine 30, which could be a traction elevator machine, includes a supplementary brake arrangement including brake devices 32 and a braking disk 34. An example procedure for retrofitting the machine with the supplementary braking arrangement is described below.

In the example of FIG. 1, the machine 30 is supported on a machine frame 36 within a machine room 38.

Figure 2:
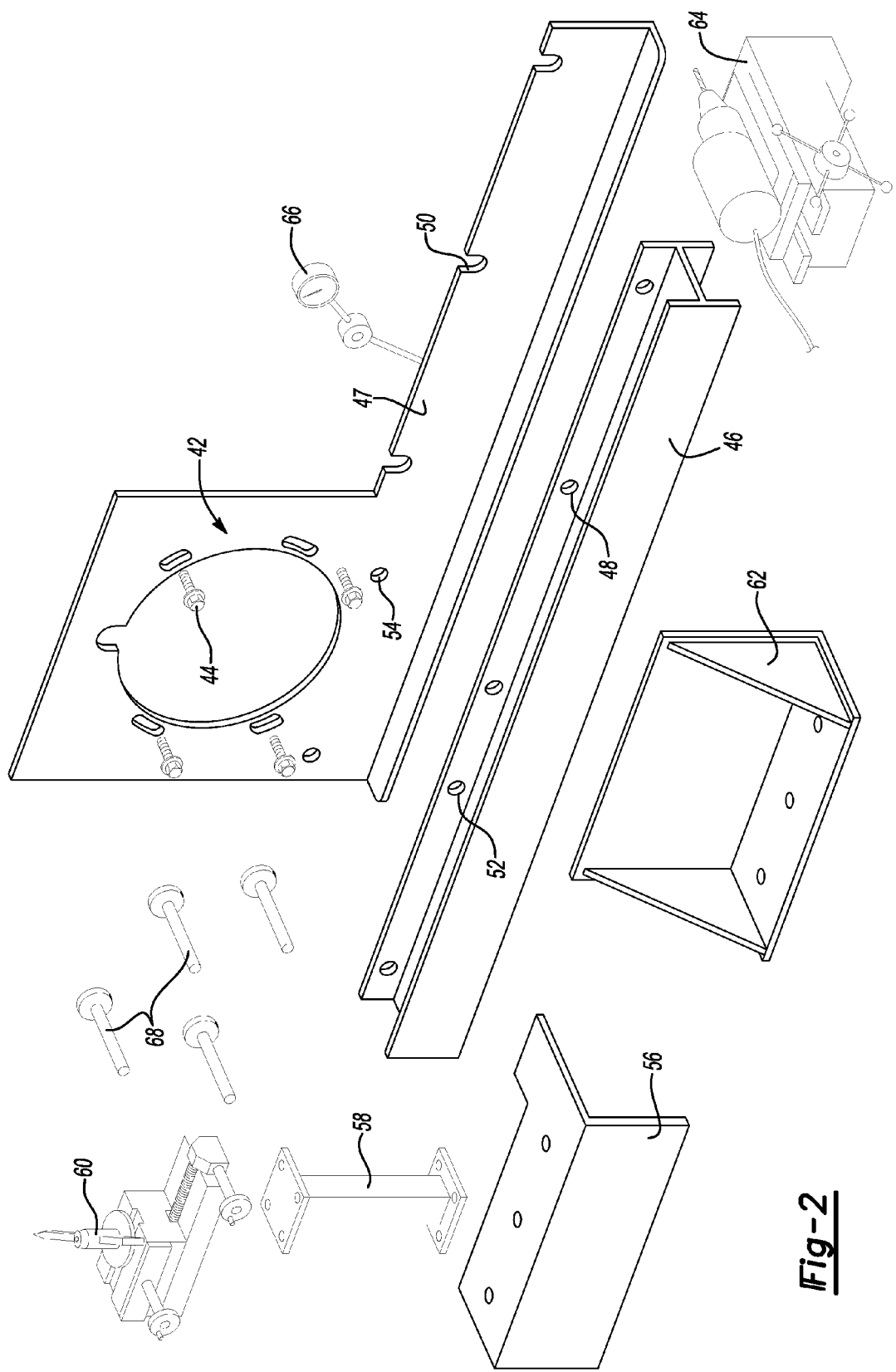
FIG. 2 diagrammatically illustrates components of an exemplary elevator machine retrofitting kit that is useful for retrofitting a supplementary brake onto an elevator machine.

FIG. 2 illustrates an example kit for retrofitting a supplementary brake onto an elevator machine. This example includes a machining bracket 42 that is secured to a selected portion of the elevator machine 30 using threaded fasteners 44, for example. The machining bracket 42 in this example includes an I-beam member 46 that is selectively secured against the plate-like portion 47 of the machining bracket 42. For example, threaded fasteners are received through holes 48 and accommodated within slots 50 to allow for the I-beam portion 46 to be adjusted relative to the plate-like portion 47 to achieve a desired orientation of the machining bracket 42 components relative to the elevator machine. Other fasteners are received through openings 52 and 54.

A support plate 56 is configured to be held in place against portions of the machining bracket 42. A stand 58 is configured to be secured to the elevator machine frame 36 to provide support to the support plate 56.

A cutting tool 60 is provided for altering a selected surface on the machine to prepare it for mounting a supplementary brake component such as a braking disk.

A mounting bracket 62 is configured to be supported by the machining bracket 42. A drill press 64 in this example has a magnetic mounting portion to be mounted onto the mounting bracket 62 so that the drill press 64 can be used to drill holes in selected portions of the elevator machine during the retrofitting procedure.

A gauge 66 is provided for confirming that surfaces involved in the retrofitting procedure have desired contours.

A plurality of eccentric pins 68 are provided for positioning components involved in the retrofitting procedure in desired locations as will be appreciated from the following description.

Figure 3:
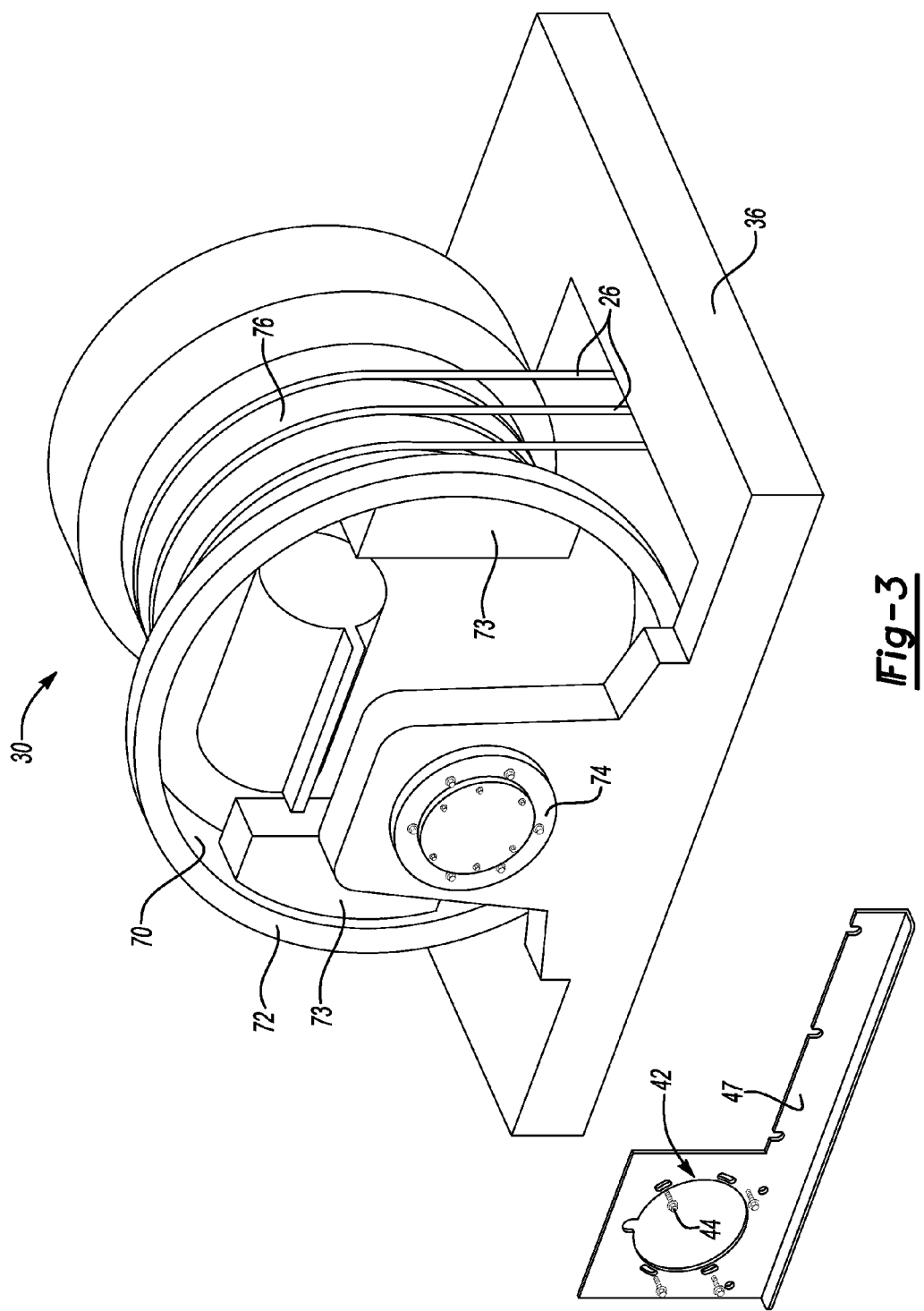
FIG. 3 schematically illustrates selected portions of an exemplary elevator machine prior to a procedure in which the machine is retrofit with a supplementary brake.

FIG. 3 shows selected portions of the elevator machine 30 including a drum 70 and drum brake components 71 that provide a primary braking function for the machine 30. In this example, the drum 70 has an outwardly facing surface 72 that is selected as a mounting surface for a braking disk of a supplemental brake that will be retrofit onto the machine 30 while the machine 30 is installed in the elevator system (e.g., supported by the machine frame 36). One feature of the example procedure is that a supplemental brake can be retrofit onto the elevator machine 30 without having to remove the machine 30 from the elevator system. Being able to leave the machine 30 fully installed as part of the elevator system provides significant cost and labor savings that would otherwise be associated with removing the machine, re-roping the elevator system, etc.

As shown in FIG. 3, the machine 30 includes the drum 70 with the surface 72. A known bearing configuration includes a bearing support plate 74. The bearing facilitates rotation of a traction sheave 76, which rotates in unison with the drum 70. A component that is fixed relative to the traction sheave 76 is useful for mounting the supplemental brake. The drum 70 is one such example component and is used in the illustrated example. Other machine components on the traction sheave 76, itself, may be used for retrofitting a supplemental brake on the machine in other examples.

Figure 4:
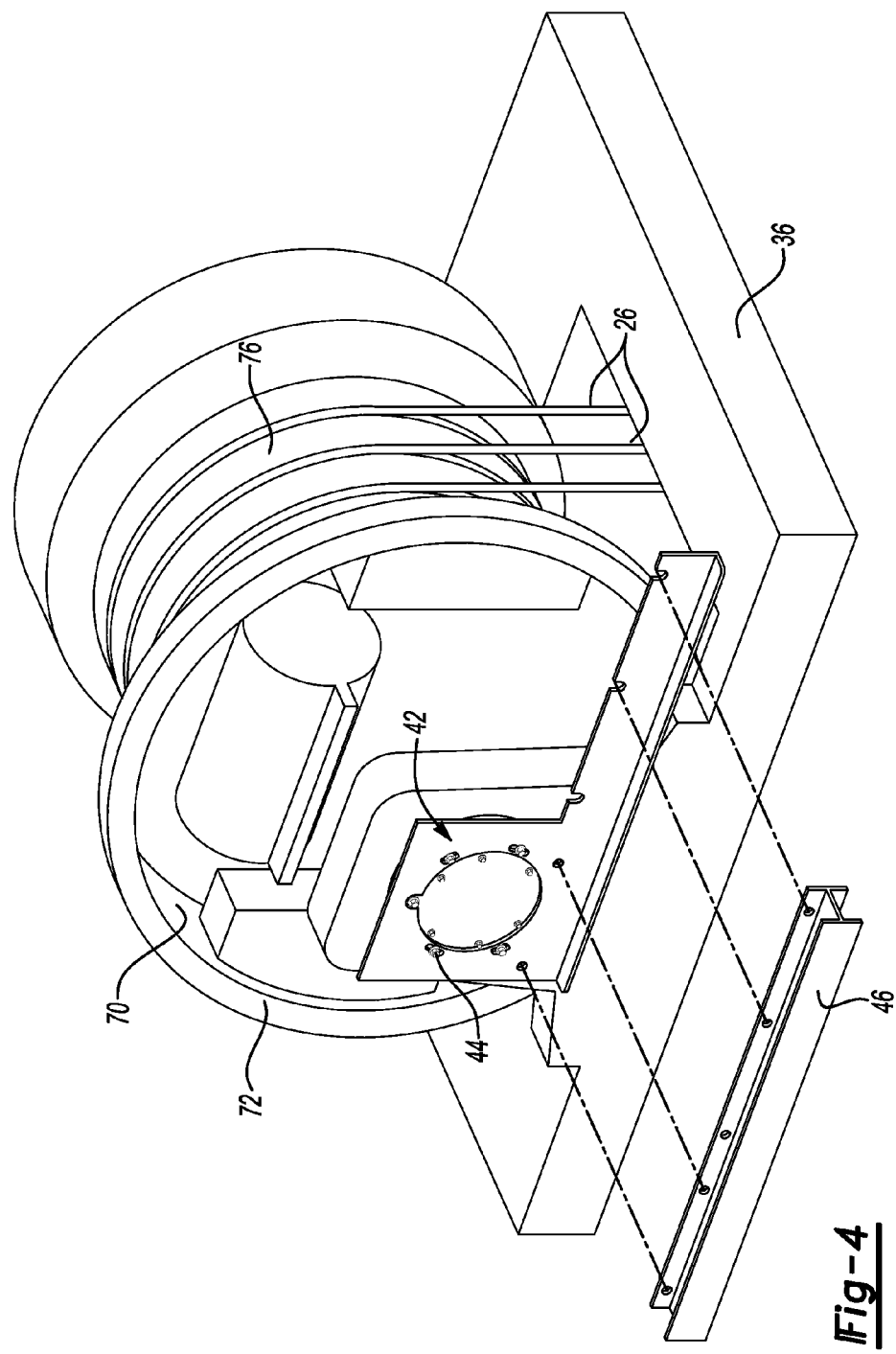
FIG. 4 illustrates a selected portion of an exemplary procedure for retrofitting the example elevator machine with a supplementary brake.

FIG. 4 shows the machining bracket 42 installed against the bearing support plate and secured in place using the fasteners 44. The I-beam portion 46 will then be secured against the plate-like portion of the machining bracket 42.

Figure 5:
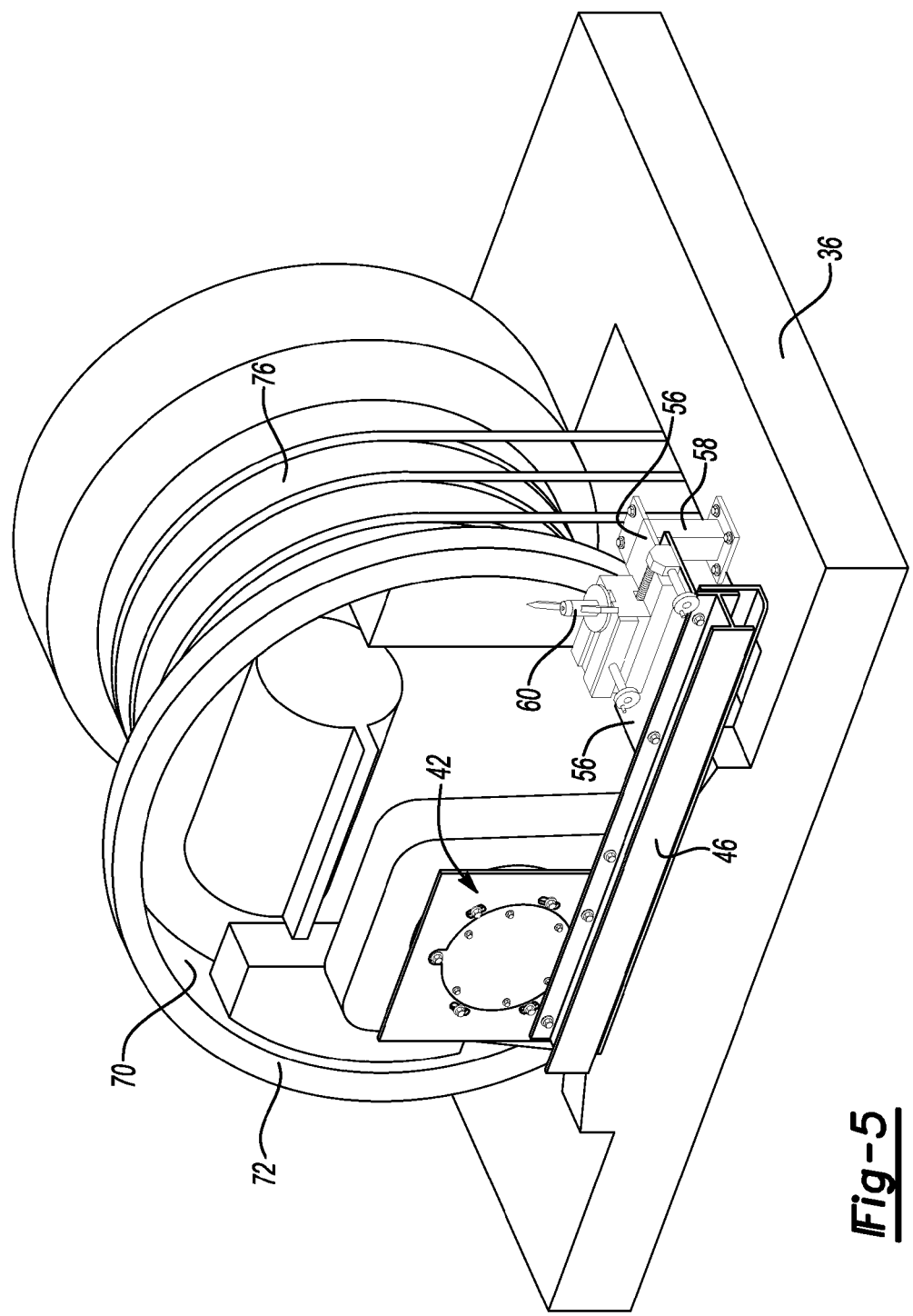
FIG. 5 schematically illustrates a subsequent portion of the exemplary procedure.

FIG. 5 illustrates the machining bracket fully installed. The I-beam portion 46 is set to level to provide a secure and level surface from which to work for purposes of retrofitting the machine 30 with a supplemental brake. FIG. 5 shows the support plate 56 secured against the machining bracket 42 and at least partially supported by the stand 58. Drilling and tapping holes in the machine frame 36 accommodates securing the stand 58 in place near the drum 70 in this example.

FIG. 5 shows a cutting tool 60 in place on the support plate 56. The cutting tool 60 is used to alter the surface 72 to provide a desired contour. The surface 72 of a typical drum 70 of an elevator machine will not be consistently flat and smooth in most situations. The cutting tool 60 is used to machine away any portion of the material on the surface 72 that would prevent it from providing a true mounting surface.

In one example, the cutting tool 60 will cut in a particular direction. The machine 30 is controlled, using known techniques, to rotate the traction sheave 76 and the drum 70 in a direction to facilitate the cutting tool 60 removing material as necessary. This involves moving the elevator car in a particular direction depending on the configuration of the cutting tool 60. One example involves positioning the cutting tool 60 to engage the surface 72, moving the machine components 30 in the desired direction and stopping when the elevator car reaches the end of possible travel in that direction (i.e., the terminal landing). The cutting tool 60 is then manipulated so that there is no contact between it and the surface 72 so that the machine can be rotated in the opposite direction until the elevator car reaches an opposite end of its possible travel. The cutting tool 60 is then repositioned for additional alteration of the surface 72 and the machine 30 causes the traction sheave 76 and drum 70 to rotate in the desired direction.

The machining bracket 42, support plate 56 and stand 58 facilitate positioning the cutting tool 60 in an appropriate orientation to achieve a desired contour of the surface 72. The cutting tool 60 in one example is configured to achieve a desired machining operation while the machine 30 operates at a speed that is available to an elevator technician, for example, during an inspection run. In another example, the cutting tool 60 is configured to operate when the elevator car is moving at or near a contract speed.

Figure 6:
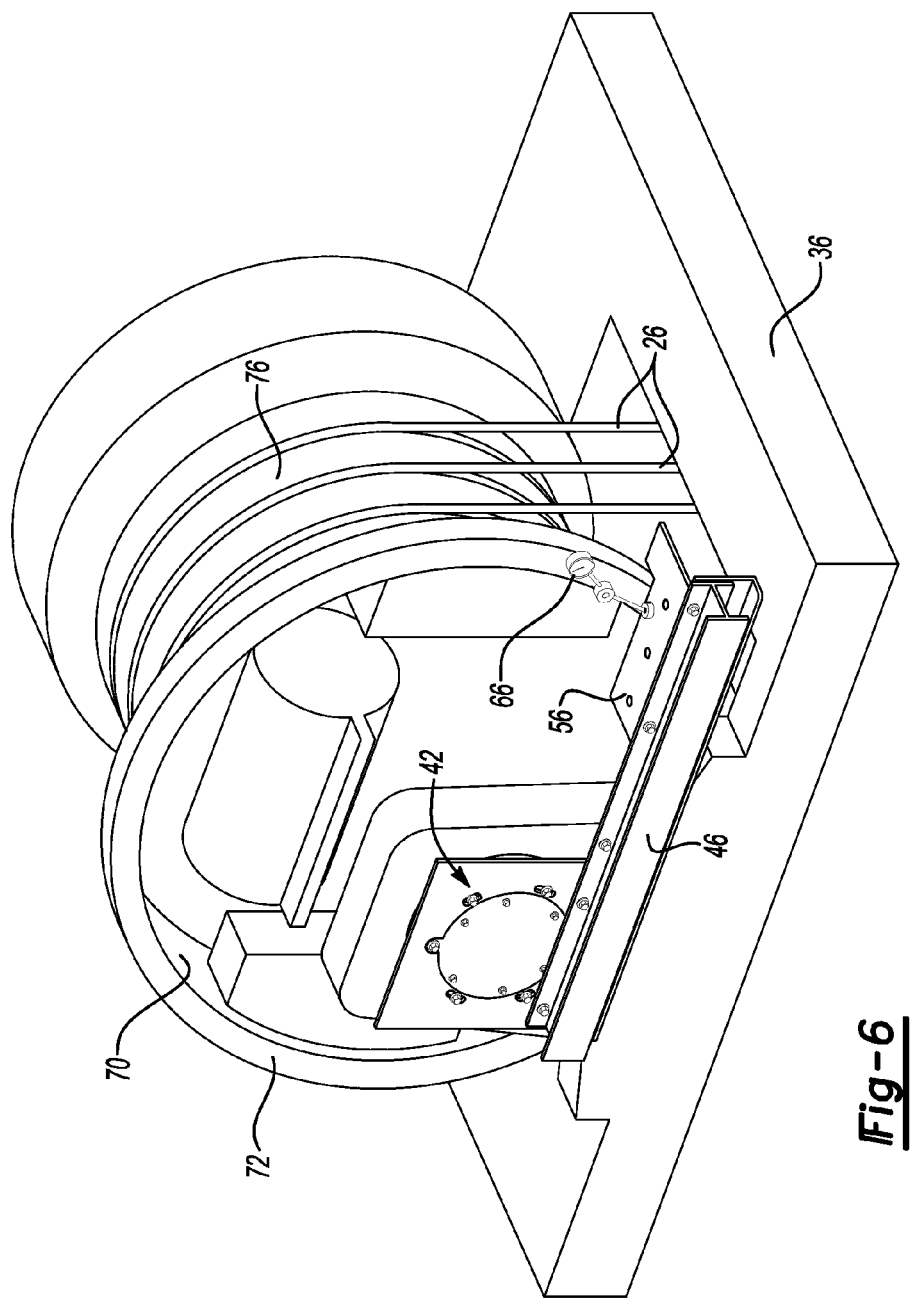
FIG. 6 illustrates a subsequent portion of the exemplary procedure.

FIG. 6 illustrates using a gauge 66 to measure the surface 72 to ensure that it has the desired contour. One example includes achieving a flat, smooth surface within 0.004 inches (0.1 mm). Some examples include achieving a surface contour that is true to the desired contour within 0.002 inches (0.05 mm) or 0.001 inches (0.025 mm). One feature of the machining bracket 42 being secured to the other portions of the machine 30 is that it provides a convenient, stable and reliable basis that allows for accurately altering the surface 72 to achieve a desired contour.

Figure 7:
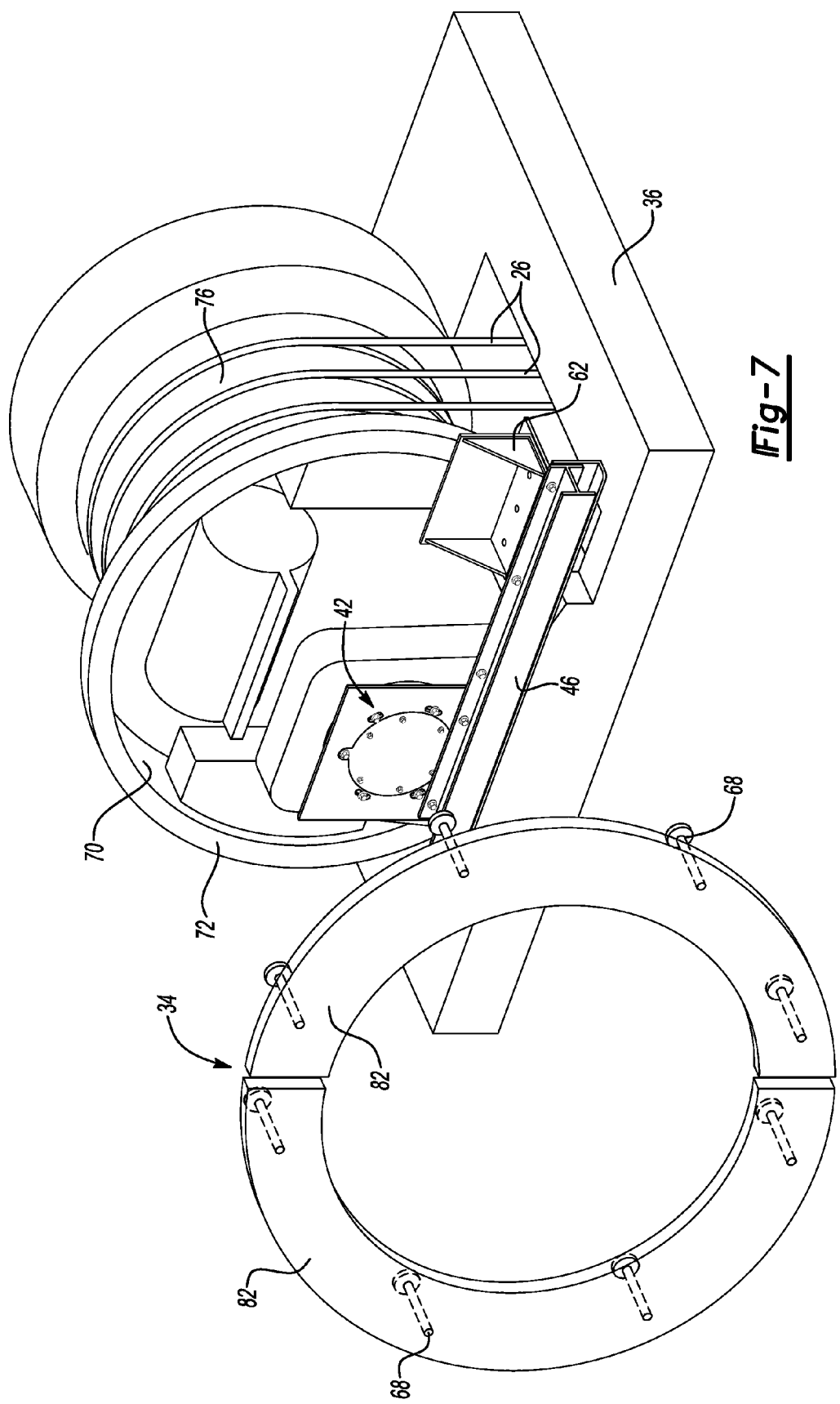
FIG. 7 illustrates a subsequent portion of the exemplary procedure.

Once the surface 72 is confirmed to have the desired contour, a braking disk of the supplemental brake can be installed. FIG. 7 illustrates a plurality of ring portions 82 that are configured to be installed onto the surface 72 to establish a braking disk. In this example, the ring portions 82 are distinct and separate pieces of metal that have been machined or formed to have a desired size and configuration. The eccentric pins 68 are utilized to at least temporarily hold the ring portions 82 in place against the surface 72 and to facilitate adjustment of the ring portions 82 into a desired orientation relative to a remainder of the drum 70.

Figure 8:
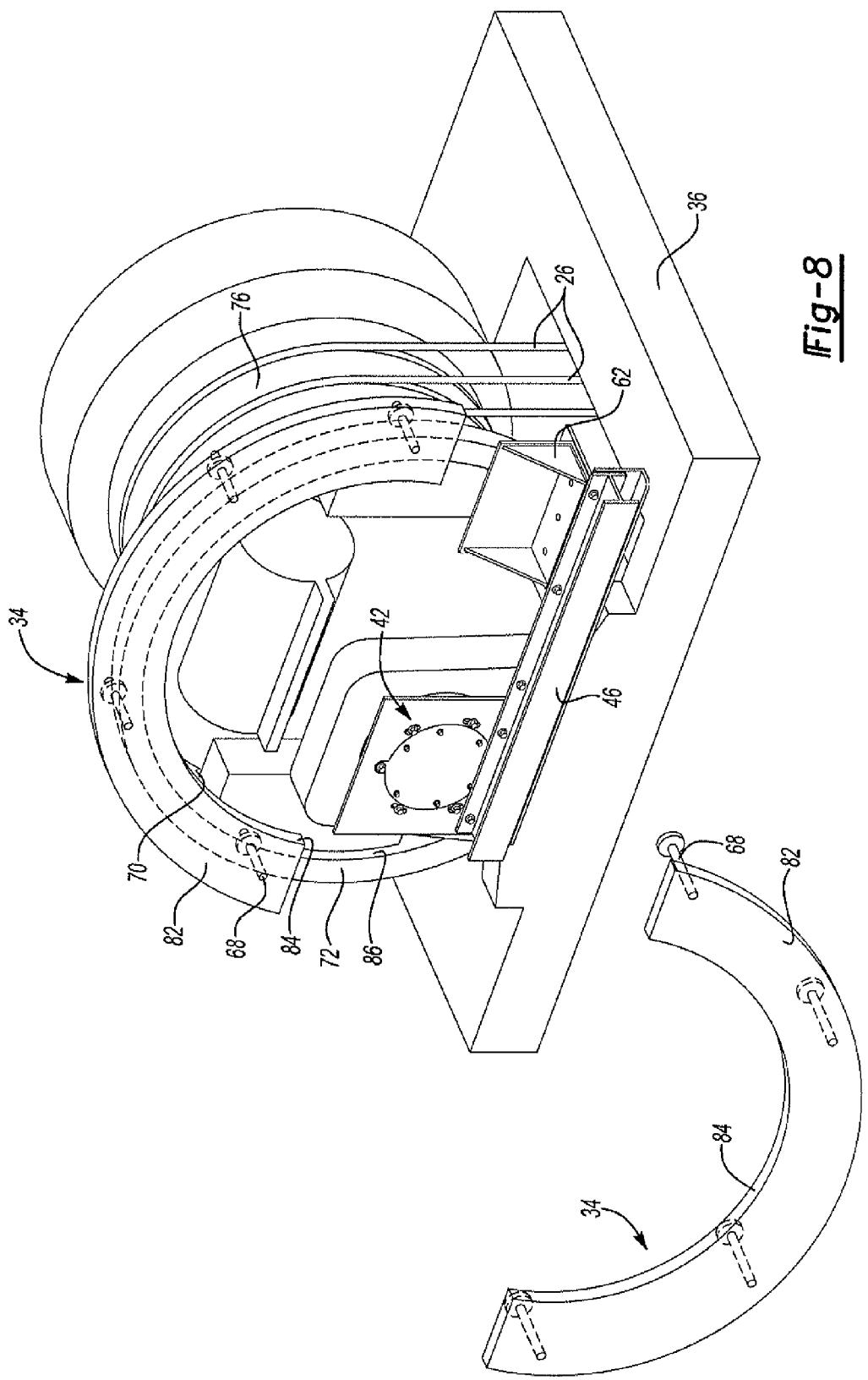
FIG. 8 illustrates a subsequent portion of the exemplary procedure.

FIG. 8 shows a portion of the example procedure in which one of the ring portions 82 is positioned against the surface 72. The eccentric pins 68 essentially grab onto the flange at the end of the drum 70 so that the ring portion 82 is held up against the surface 72. The eccentric pins 68 have a known configuration and can be manipulated to align an inner edge 84 of the ring portion 82 with an inner edge 86 of the edge of the drum 70 that includes the surface 72. In one example, the edge 84 is aligned as closely as possible to be exactly in line with the edge 86. In other examples, different positions are possible. One feature of using the edge 86 for alignment is that it provides a reliable guide to achieve accurate positioning of the ring portion 82 relative to the drum 70. Another example includes scribing a reference onto the machine 30 and using that as a locating guide.

Once the ring portion 82 as shown in FIG. 8 is held in place, then a second ring portion 82 is temporarily attached to the first ring portion using fish plates 90 and held against the drum 70 by eccentric pins 68. The machine 30, the traction sheave 76 and the drum 70, are selectively rotated to allow the ring portions 82 to be positioned during the installation procedure.

Figure 9:
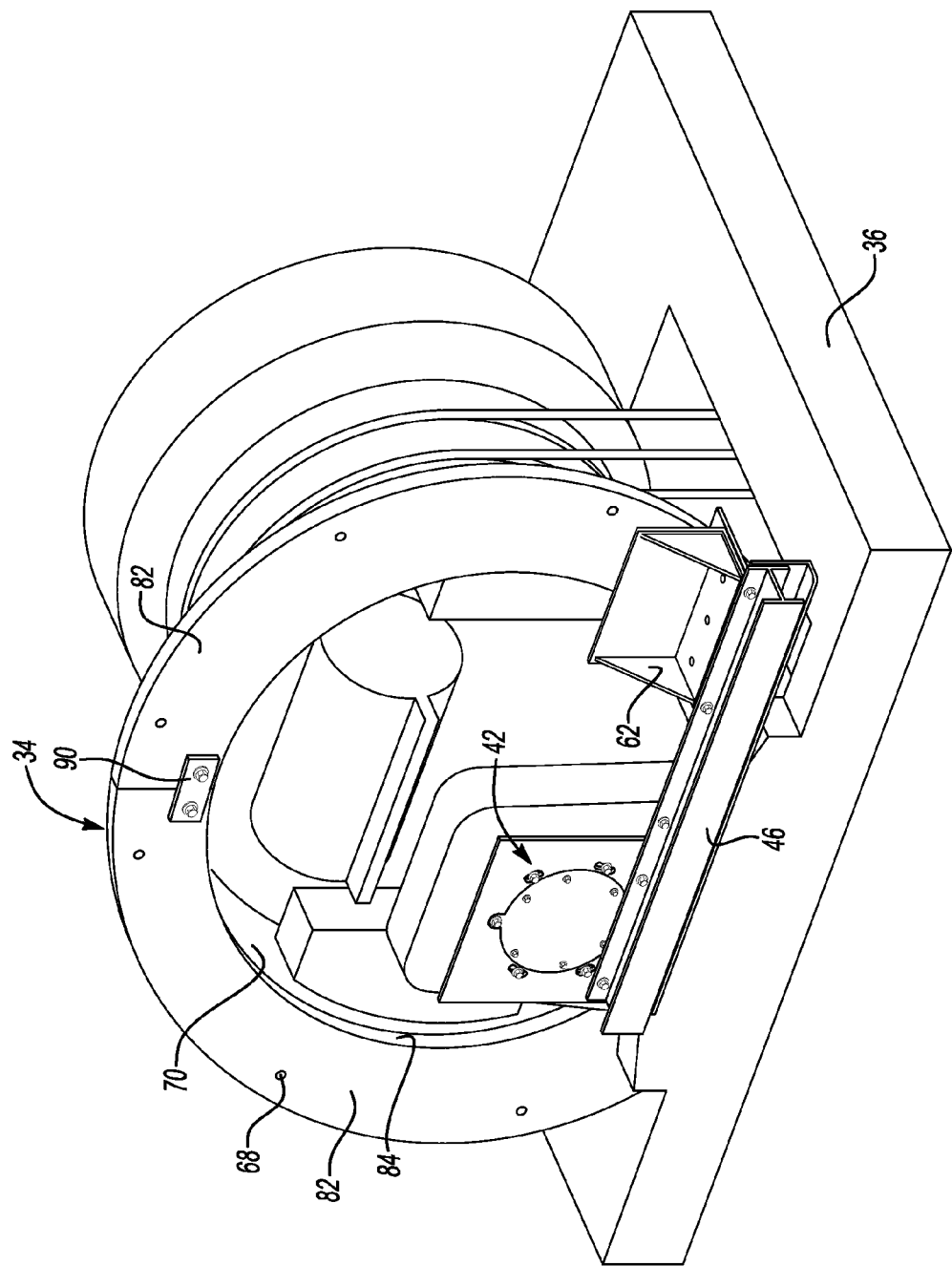
FIG. 9 illustrates a subsequent portion of the exemplary procedure.

FIG. 9 illustrates the example arrangement after both ring portions 82 are held in place by the eccentric pins 68. At this stage of the procedure, the fish plates 90 secure the edges of the ring portions 82 against each other so that a desired alignment between the portions is achieved. In this example, the ring portions 82 are pre-machined to have a surface contour that is desired for braking operation.

Figure 10:
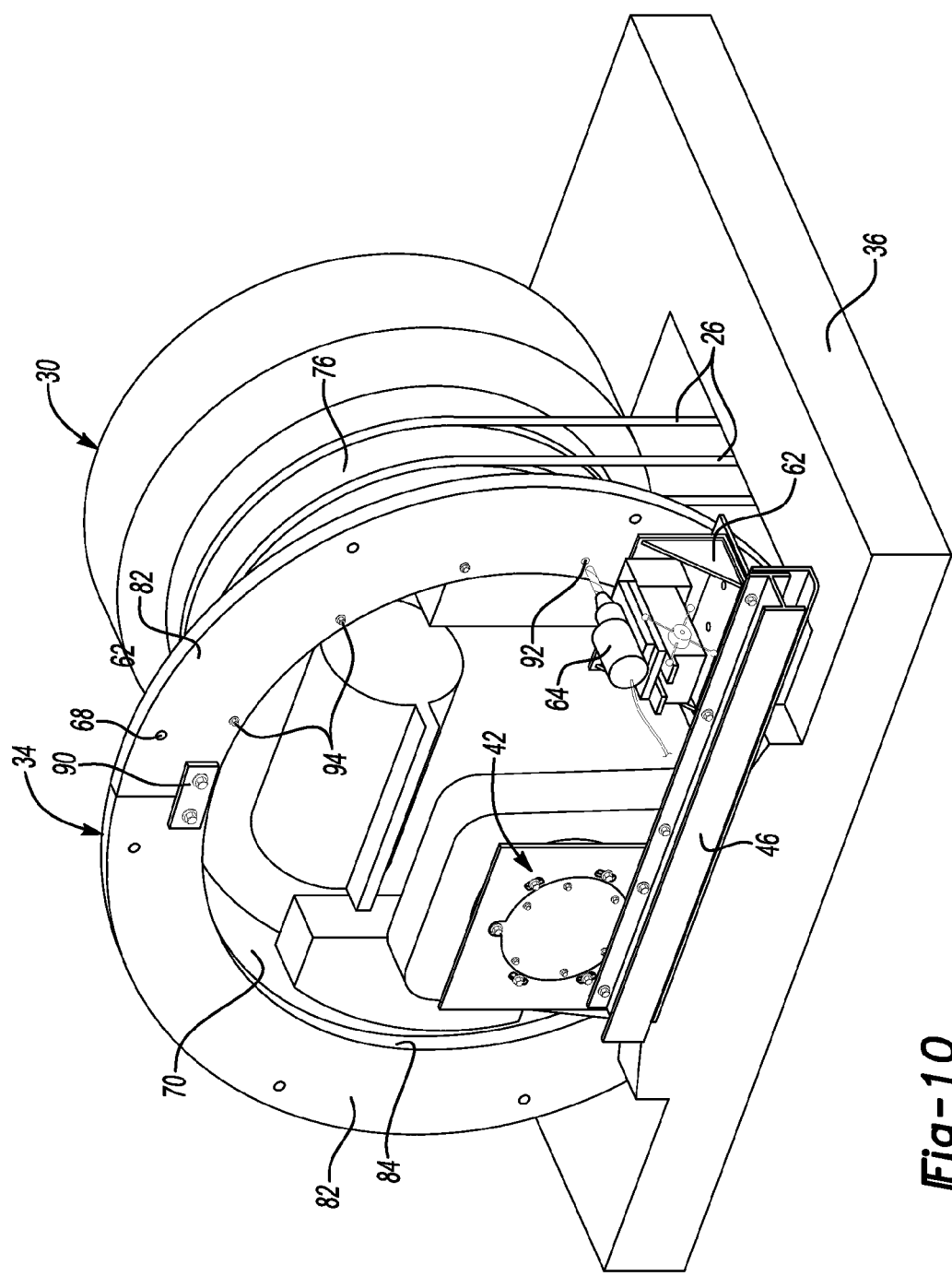
FIG. 10 illustrates a subsequent portion of the exemplary procedure.

FIG. 10 shows a subsequent portion of the example procedure. At this stage, the mounting bracket 62 is secured against the machining bracket 42 and the drill press 64 is secured against the mounting bracket 62. In this example, the drill press 64 is magnetically mounted to the mounting bracket 62. The drill press 64 is positioned to drill a plurality of holes 92 into the material of the drum 70 so that threaded fasteners 94 are received through mounting holes in the ring portions 82 and into the holes that were established by the drill press 64 in the drum 70. The mounting holes in the ring portions 82 may be predrilled before the ring portions 82 are secured in place against the machine 30. In some examples, the mounting holes through the ring portions 82 are established using the drill press 64 after the ring portions are at least temporarily secured in place against the surface 72. Controlling the machine 30 to rotate it into a plurality of positions to accommodate drilling the necessary holes can be achieved using known techniques of elevator machine control.

Figure 11:
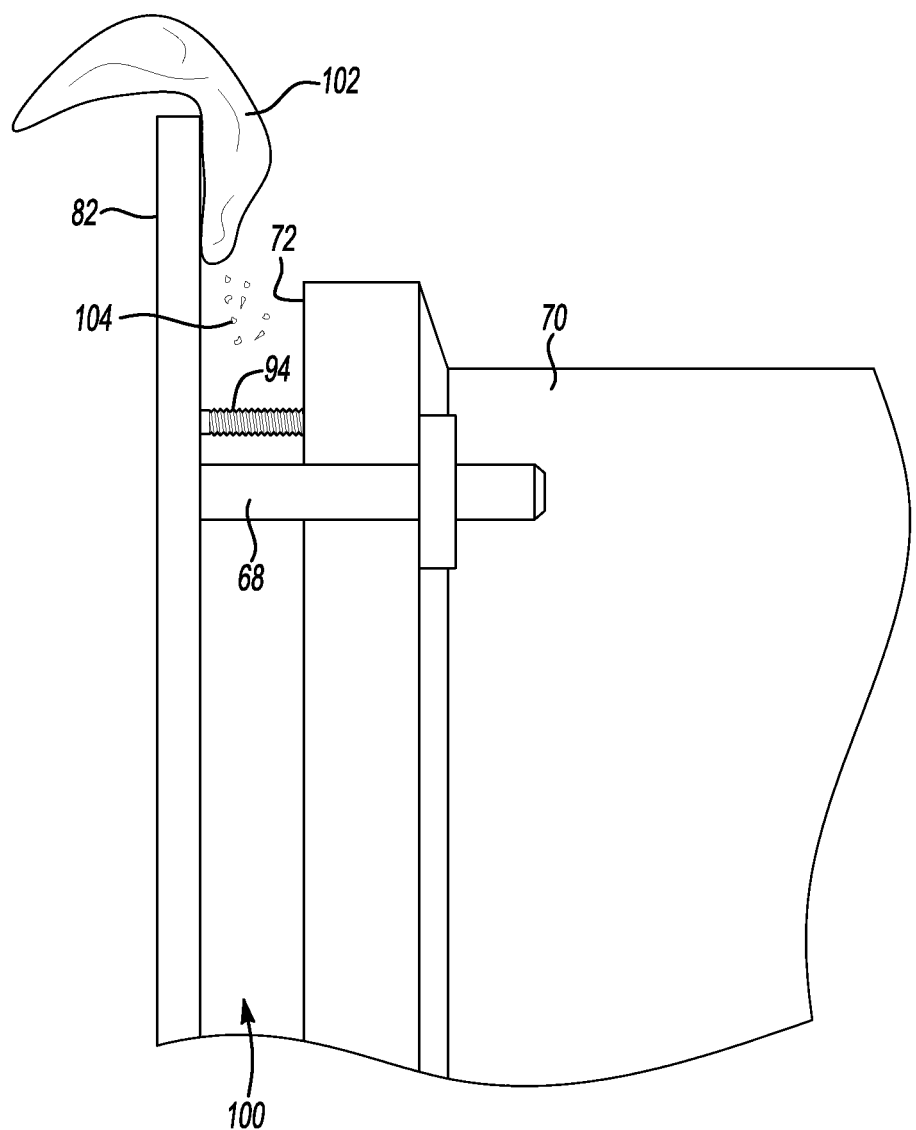
FIG. 11 illustrates a subsequent portion of the exemplary procedure.

After all the holes have been drilled and the fasteners 94 are at least partially in place, the eccentric pins 68 and fasteners 94 are manipulated to provide a spacing 100 between the ring portions 82 and the surface 72. This is shown in FIG. 11. During the drilling operation it is possible for some debris to accumulate between the surface 72 and the ring portion 82. The example of FIG. 11 includes a cleaning component 102 such as a cloth for removing any debris schematically shown at 104 so that the ring portions 82 are received appropriately against a clean surface 72 on the drum 70.

Figure 12:
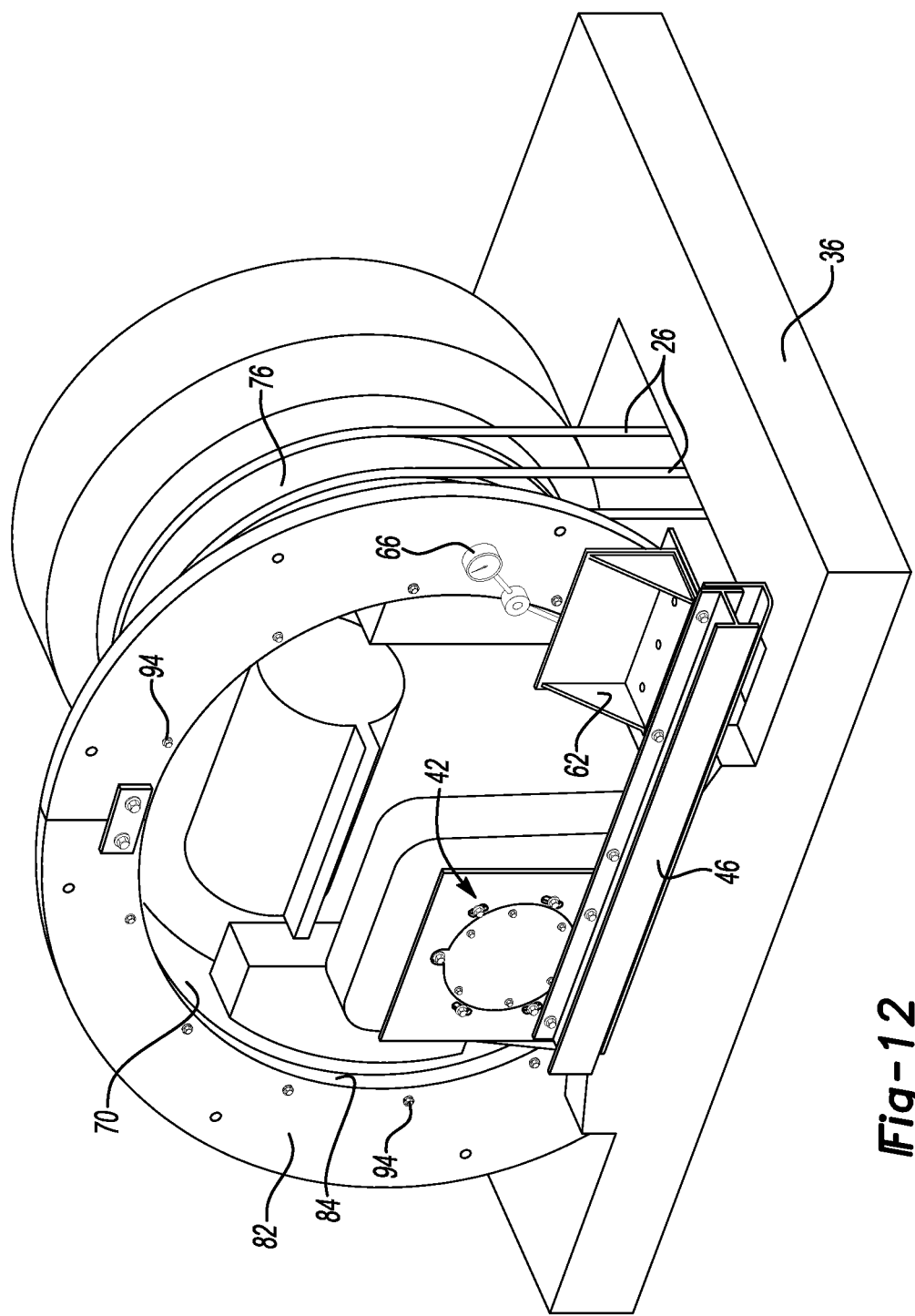
FIG. 12 illustrates a subsequent portion of the exemplary procedure.

After the surfaces are appropriately cleaned, the fasteners 94 are tightened to secure the ring portions 82 in place against the surface 72. As shown in FIG. 12, once the ring portions 82 are in place, the gauge 66 can be utilized to ensure that the braking disk 34 established by the ring portions 82 is correctly oriented relative to the remainder of the machine components. Controlling the machine 30 using known techniques allows for rotating the braking disk 34 to ensure that it has an appropriate orientation and configuration. The eccentric pins 68 can be removed once the fasteners 94 have secured the ring portions 82 in place against the surface 72 of the drum 70.

Figure 13:
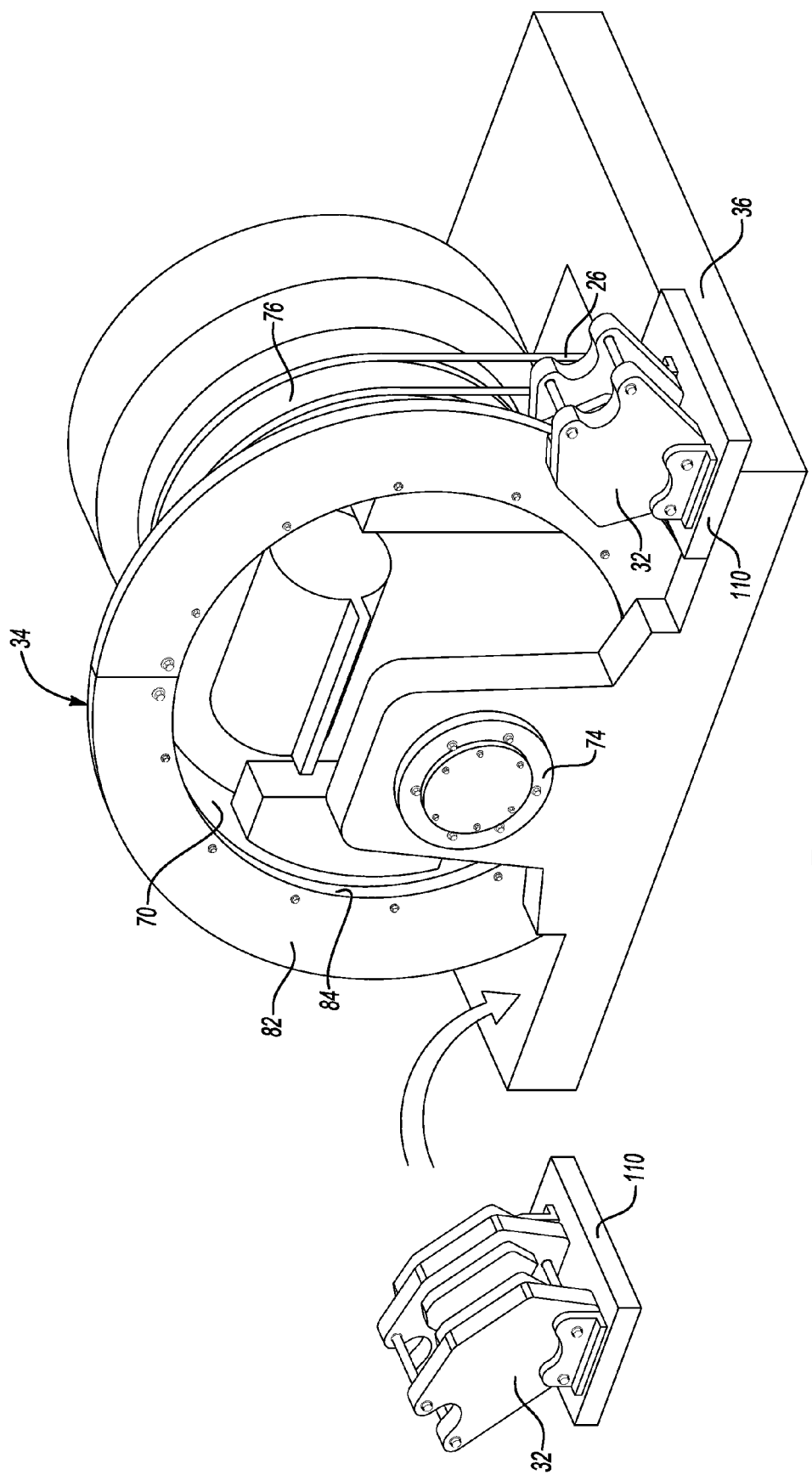
FIG. 13 illustrates a subsequent portion of the exemplary procedure.

As shown in FIG. 13, once the braking disk 34 is fully installed, the machining bracket 42 and associated components are removed. Brake members 32 are then installed to selectively engage the braking disk 34 to provide a supplemental braking function for the machine 30. This example includes brake components on mounting bases 110 that are secured against the machine frame 36. One example includes positioning the brake members 32 in a desired location relative to the disk 34 and marking the machine frame 36 for drilling holes to receive fasteners (not illustrated) to secure the mounting bases 110 in a desired position against the machine frame 36. Appropriate electrical connections (not shown) are made between the brake members 32 and the controllers (not shown) associated with the elevator machine 30 so that a supplementary braking function is achieved when desired.

Once the brake members 32 are installed, the machine 30 is ready for operation to provide elevator service and the configuration is as schematically shown in FIG. 1.

Those skilled in the art who have the benefit of this description will realize that a variety of brake configurations and a variety of machine configurations could be used that are different than the illustrated example. The techniques associated with the example retrofitting procedure may be used in a variety of elevator system configurations to retrofit a previously installed elevator machine with a supplementary brake.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of adding a brake to an elevator machine that is used to cause selective movement of an elevator car, the elevator machine having been previously installed in an elevator system, comprising the steps of:
   selecting an exterior surface on a brake drum of the previously installed elevator machine that is distinct from a sheave of the machine, the surface rotating as the sheave rotates;
   providing a braking surface on said selected surface; and
   installing at least one braking member in a position to selectively engage said braking surface.

2. The method of claim 1, wherein at least one of the providing or installing occurs while the machine is still installed in the elevator system.

3. The method of claim 1, wherein said providing step comprises:
   altering the selected surface to provide a mounting surface having a desired contour;
   securing a plurality of ring portions to the mounting surface while the machine is still installed in the elevator system to provide a braking disc on the machine.

4. The method of claim 3, wherein the altering comprises
   positioning a cutting tool adjacent the selected surface; and
   rotating the surface such that the cutting tool removes a selected amount of the surface.

5. The method of claim 4, wherein rotating the surface comprises moving an associated elevator car in a desired direction.

6. The method of claim 3, wherein the plurality of ring portions have locating holes and the securing comprises
   inserting a locating member into each locating hole of the ring portions;
   supporting the ring portions adjacent the mounting surface using the locating members; and
   securing the ring portions together while the ring portions are adjacent the mounting surface.

7. The method of claim 6, wherein the securing comprises
   making holes in the mounting surface at desired locations; and
   inserting fasteners into the holes in the mounting surface to thereby secure the ring portions to the mounting surface.

8. The method of claim 7, comprising
   spacing the ring portions from the mounting surface after making the holes in the mounting surface;
   cleaning at least some of the mounting surface and at least some of the ring portions; and
   placing the ring portions against the cleaned mounting surface prior to securing the fasteners in the holes in the mounting surface.

9. The method of claim 3, comprising
   securing a machining bracket to the machine near the selected surface;
   using the machining bracket to position a cutting tool for performing the altering; and
   using the machining bracket to position a tool used to make holes in the mounting surface for receiving fasteners for the securing.

10. The method of claim 9, comprising
using the machining bracket to position a gauge for determining whether the mounting surface has the desired contour; and
using the machining bracket to position a gauge for determining whether the ring portions are aligned in a desired orientation.

11. The method of claim 9, comprising
securing a portion of a stand against a portion of a machine frame; and
using the stand and the machining bracket to support and position the cutting tool.

12. The method of claim 3, wherein installing the at least one braking member comprises
positioning the at least one braking member relative to the braking disk such that a mounting base of the braking member is supported on a machine frame that supports the machine; and
securing the mounting base to the machine frame in a location corresponding to the positioning.

13. A kit for retrofitting a supplemental brake onto an elevator machine that is used to cause selective movement of an elevator car, the elevator machine having been previously installed in an elevator system, comprising:
a machining bracket configured to be secured in a fixed position relative to the previously installed elevator machine to provide a set work surface for positioning tools relative to the machine to complete the retrofitting;
a plurality of ring portions;
locating members for at least temporarily positioning the ring portions adjacent a selected exterior surface on a brake drum of the previously installed elevator machine, the selected surface being distinct from a sheave of the elevator machine;
mounting members for securing the ring portions in a desired position relative to the previously installed machine such that the ring portions provide a braking disk; and
at least one brake device that is configured to be supported on a machine frame that supports the elevator machine so that the brake device can selectively engage the braking disk.

14. An elevator machine that is used to cause selective movement of an elevator car, the elevator machine having been retrofitted from an original arrangement, the elevator machine comprising:
a sheave that is rotatable;
at least one component that rotates with the sheave, the at least one component comprising a drum of a drum brake of the machine having been installed as part of the original arrangement;
a disc braking surface on an exterior of the drum that did not exist in said original arrangement; and
at least one brake member to selectively engage the disc braking surface to provide a brake force to control movement of the traction sheave.

15. The elevator machine of claim 14, including a brake system that existed in said original arrangement, wherein said brake system and said brake member are different types of brakes.

16. The elevator machine of claim 14, wherein said braking surface comprises a plurality of ring portions secured to a mounting surface on the at least one component, the plurality of ring portions establishing a braking disk.

17. The elevator machine of claim 16, wherein the drum brake is a primary brake of the machine and the braking disk and the at least one brake member are a supplemental brake of the machine.

* * * * *